Nov. 20, 1951  J. JEFFREY ET AL  2,576,017
AUTOMOBILE HOOD POSITION WARNING INDICATOR
Filed Feb. 9, 1949
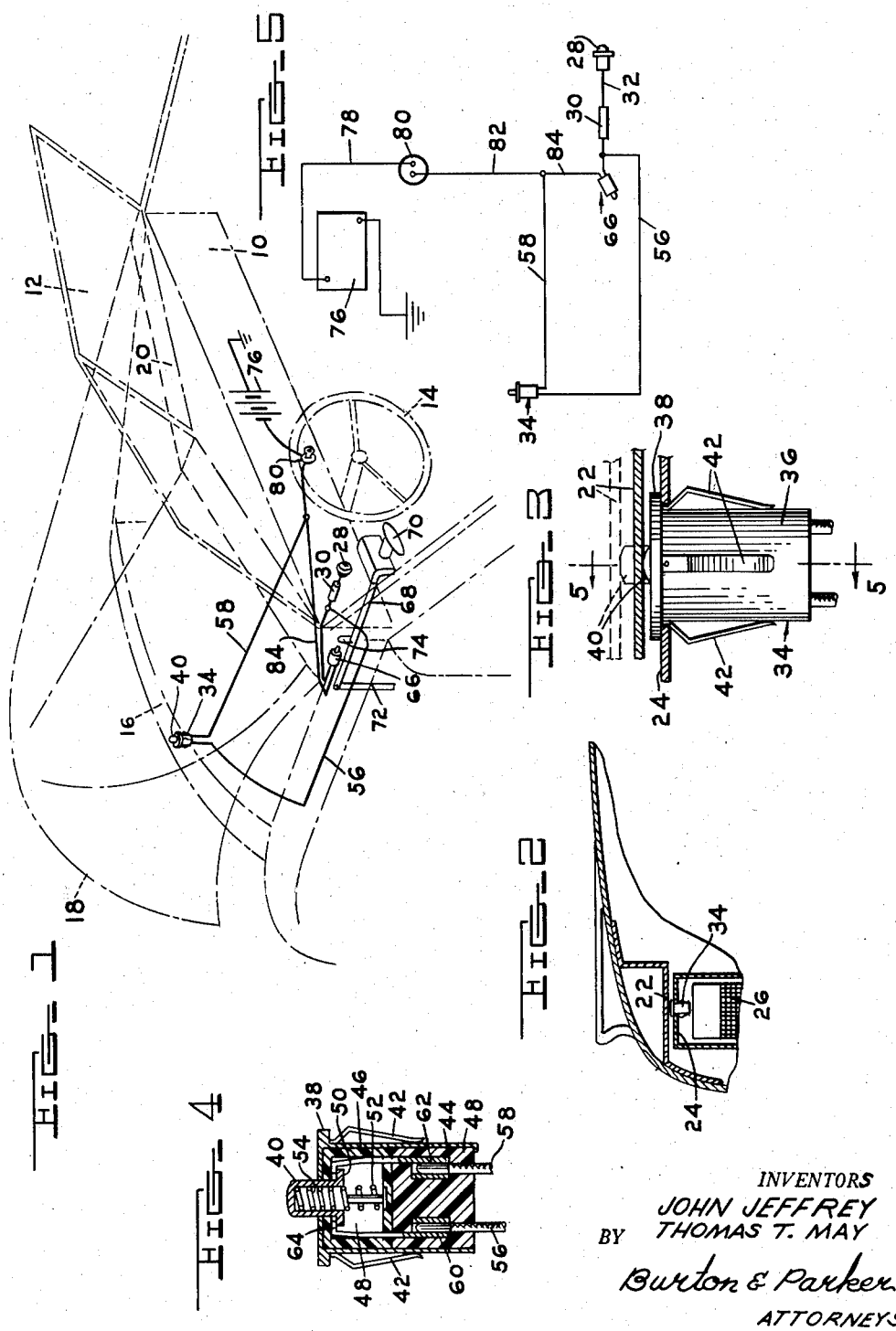
INVENTORS
JOHN JEFFREY
THOMAS T. MAY
BY
Burton & Parker
ATTORNEYS Patented Nov. 20, 1951

2,576,017

UNITED STATES PATENT OFFICE 2,576,017

AUTOMOBILE HOOD POSITION WARNING INDICATOR

John Jeffrey, Mount Clemens, and Thomas T. May, Grosse Pointe Park, Mich.

Application February 9, 1949, Serial No. 75,392

2 Claims. (Cl. 177—311)

This invention relates to means for indicating to motorists an unsafe condition with respect to their vehicle and particularly to a warning device for signalling when the front hood of the motor vehicle is not firmly and securely shut.

In recent years, many makes of automobiles have hinged the front hood of the motor vehicle in such a manner that it opens upwardly and rearwardly of the vehicle and opposite to the forward direction of travel of the vehicle. It is the practice to employ a primary latching device for holding the hood safely and securely shut and a secondary latching device for initially holding the hood in loosely closed position. Under the relatively high speeds, it has frequently happened that if the hood is not securely closed shut, such as being held by the secondary latch, the air flow created by the forward movement of the vehicle will cause the hood to fly open. In such circumstances, the hood obscures the vision of the driver and under the high speed of travel produces an extremely hazardous condition.

An important object of this invention is to provide a warning device for indicating to the driver of the vehicle that the hood is not safely and securely shut which is capable of being installed at the time of the manufacture of the vehicle or being attached as an accessory on the vehicle. Another important object of the invention is to provide a warning device of this character consisting of a few parts capable of manufacture at low cost and which is readily and conveniently installable on all makes of automobiles. A further important object of the invention is to provide a warning device of this character which is combined in a novel manner with a second warning device, the two devices utilizing the same means to indicate to the driver an undesired condition of the vehicle.

In carrying out the invention, the warning device of the present invention is preferably in the form of an electric circuit including a signalling element, such as a flashing lamp, and a switch responsive to the movement of the front hood and capable of closing the circuit to the element when the hood is in any other position than safely and firmly shut. An important feature of the invention is the mounting of the switch with respect to the hood such that when the hood is safely shut by the primary latch the switch is open but when the hood is loosely held by the secondary latch or at any more open position the switch is closed. Another important feature of the invention is the provision of a circuit having the dual function of indicating not only when the front hood is not securely shut but also the undesired condition of another operating part of the automobile, such as the hand brake. A dual functioning circuit of this character has the advantage of utilizing the same indicating means, such as a flashing light, for informing the driver of the undesired condition of either vehicle part and thus reduce the ultimate cost of such warning devices to the consumer.

Various other objects, advantages and meritorious features of the invention will become more fully apparent from the following specification, appended claims and accompanying drawing wherein:

Fig. 1 is a perspective view showing in dotted outline the forward part of an automobile having the front hood in partially open condition and showing in full line the installation of the present invention therein, Fig. 2 is an enlarged vertical sectional view through the front end of an automobile showing the mounting of the control switch and the hood in fully closed position, Fig. 3 is a further enlarged view of the hood control switch and a desired form of mounting in the automobile, Fig. 4 is a longitudinal sectional view through the hood control switch, and Fig. 5 is a diagram of a circuit for indicating when either the hood or the hand brake are in undesired positions.

As previously mentioned, the invention is intended for those types of motor vehicles having front hoods which are capable of being blown open by the flow of air caused by the forward movement of the vehicle. Although the details of mounting such hoods may vary on different makes of automobiles, essentially in such forms of mountings the rear end of the hood is connected to the vehicle body slightly forward of the windshield and the front end of the hood is capable of upward and rearward swinging movement about such connection. As the front end of the hood is raised it obstructs the view through the windshield.

Referring to Fig. 1, there is shown in dotted outline the front portion of an automobile including the dash or instrument panel 10, windshield 12, steering wheel 14, radiator housing 16 and the hood 18 which conventionally covers the engine compartment. The rear end of the hood is hinged or otherwise connected to the body of the automobile slightly forward of the windshield and usually on the cowl 20. In closed position the front end of the hood overlies the radiator housing 16 and projects downwardly in front thereof in order to merge with the front grill work. Although hoods vary in construction on the different makes of automobiles they are usually provided with a part such as indicated at 22 in Fig. 2 which in the closed position of the hood lies closely adjacent to the top wall 24 of the housing 16 in which the radiator is located. The radiator proper is indicated at 26. When the hood is raised the front end thereof is lifted exposing the interior of the compartment over which the hood normally extends.

As heretofore mentioned, it is the practice to provide a primary safety latch for safely and firmly holding the hood in tightly closed position and to provide a secondary latch which loosely holds the hood in place. Quite frequently the hood is mistakenly held only by the secondary latch and in such condition is likely to be blown open when the vehicle is driven at a relatively high rate of speed. At gasoline stations, it is nearly the universal practice to let the attendants both open and close the hood and due to carelessness or unfamiliarity with the latches the attendants occasionally fail to securely close the hood.

The primary and secondary hood latches are of different construction and in certain makes of automobiles only one latching device may be employed. When operated to closed positions the primary latch, or the single latch if only one is employed, pulls the hood tightly shut and holds the same safely and firmly closed. When held by the secondary latch or merely dropped to closed position, the hood is loose with respect to the top of the radiator or its housing and has a permitted downward movement from that position to its fully closed position. This difference in the two positions of the hood is utilized to actuate the warning device of the present invention.

Located in the driver compartment is a warning device which may be an audible signal but is herein shown as a flashing light. In the latter instance the signalling medium is an electric light bulb 28 preferably mounted on the dash panel 10 in front of the driver. In order to flash the light there is provided an element 30 for alternately interrupting the current to the light. Such element is of conventional design and is herein shown as a cylindrical member, one end of which is connected to the light bulb by an electric lead wire 32.

In circuit series relationship with the current interrupter and the light bulb is a make and break switch 34 which is actuated by the hood 18. For this purpose the switch 34 is preferably located adjacent to the front end of the hood in position to be operated in the final closing positions of the hood. As shown, the switch is mounted in the top wall 24 of the housing enclosing the radiator although it is understood it may be located in any other convenient position for operation by the hood. The switch as shown in the enlarged detail view of Fig. 3 is preferably formed with a cylindrical body 36 and a circular plate member 38 fixed to the upper end of the body and oversize the latter so as to form a circular lip therearound. Carried by the body and projecting from the upper end thereof is a plunger or switch contact member 40. The plunger is yieldingly urged or biased to a raised position such as shown in dotted outline in Fig. 3. In order to mount the switch in place, a circular hole slightly larger in diameter than the body 36 but undersize the plate 38 is drilled in the top wall 24 of the radiator housing. The switch body is dropped through the hole in order that the lip formed by the plate 38 may rest on the upper surface of the radiator housing. To secure the switch against removal and to hold the same against lateral movement, it is preferred to provide one or more outwardly bent resilient elements 42. These elements may be pinned or otherwise fixed at their upper ends to the switch body and have their lower ends free in order to collapse against the sides of the body. When the switch body is projected through the hole the spring elements are collapsed against the sides of the body and after the body is fully inserted as shown in Fig. 3 they spring out to releasably lock the switch against removal and to hold the body against lateral play.

Thus mounted, the plunger 40 of the switch projects above the top wall of the radiator housing in position to be engaged and depressed by the part 22 of the hood in its final closing movements. The final safely closed position of the hood is shown by the full line position of the part 22 in Fig. 3. In this position the plunger has been engaged by the part and depressed sufficiently to open the contacts in the switch body. In the loosely closed position of the hood, such as when merely secured by the secondary latch, the position of the part 22 is indicated in dotted outline in Fig. 3. In this position the plunger has been raised by spring pressure and closes the switch contacts in the body. The switch is thus operable from open to closed condition between the two positions assumed by the hood when merely held by the secondary latch and when firmly closed by the primary latch.

In Fig. 4, the interior construction of a make and break switch typifying switch 34 is shown. The switch of Fig. 5 comprises an outer cylindrical metal casing or shell 44 and two blocks of electrical insulation material 46 and 48 occupying opposite end sections of the interior of the casing and abutting one another in the middle thereof. The casing may have secured thereto a lip 38 of the character shown in Fig. 3 and a plurality of resilient fingers 42 of the type previously described. The insulation block 46 in the upper portion of the casing is hollowed to form a chamber 48 into which the contact button 40 is depressible. The contact button is likewise hollow and is provided on its lower end with an outwardly projecting circular flange 50. An upright pin 52 is fixed to the bottom of the block 46 in axial alignment with the contact button and when the latter is depressed is received therein. Received in the hollow interior of the contact button is one end of a coil spring 54, the opposite end of which encircles the pin 52 and is seated upon the bottom of the insulation block 46. It is evident that the spring 54 acts to yieldingly urge the contact button to its raised projecting position.

The insulation block 48 in the opposite end of the casing is provided with two bores for receiving the terminal ends of two wires 56 and 58 forming part of the electrical circuit of the device. The terminal ends of the wires are engaged by contact blades 60 and 62 of corresponding shape and formation which project upwardly into the chamber 48 of the upper insulation block 46. The upper ends of the contact blades 60 and 62 are bent inwardly as at 64 for overlapping engagement with the outwardly flanged end 50 of the contact button. It is evident that when the contact button is raised to its maximum projecting position as shown in Fig. 4 that it will engage the inwardly bent ends of the contact blades 60 and 62 and close the circuit through the wires 56 and 58. Slight depression of the contact button, however, will disengage the button from the contact blades and break the circuit.

Fig. 5 diagrammatically illustrates the circuit for the device and its incorporation in a circuit for indicating when the hand brake is in brake applying position while the automobile is moving. The two wire leads 56 and 58 from the make and break switch 34 are arranged in circuit parallel relationship with a similar make and break switch 66 which is operated by the hand brake. This switch may be mounted as shown in Fig. 1 adjacent to the hand brake control rod 68 which projects through the dash panel and carries on its outer end a handle 70. The control rod of the handle brake construction illustrated herein is mounted for slidable axial movement substantially perpendicular to the plane of the dash panel and is connected by a link 72 to any suitable mechanism for applying the brake upon either or both sets of wheels of an automobile. The rod 68 carries an upstanding projection 74 which is abuttingly engageable with the switch 64 to close and open the same.

In the illustrated embodiment of the invention the switch 66 is arranged to be opened when the projection 74 engages the same in which position the hand brake is in brake release position. However, upon retraction of the handle 70 to apply the brake, the switch 66 is adapted to be closed thereby closing the circuit of the signal indicating means 28.

The circuit for supplying current to either the hood signalling device or to the hand brake signalling device is preferably connected through the ignition switch to the storage battery 76 of the vehicle. A wire lead 78 extending from the battery preferably passes through the ignition switch schematically indicated at 80 in Fig. 5 and thence by way of lead 82 to the two switch mechanisms 34 and 66. In order that both control devices may function independently of one another the switches 34 and 66 are mounted in circuit parallel relationship as shown in Fig. 5, there being provided the branch lead 58 extending to the switch 34 and the branch lead 84 extending to the switch 66. By this means a single circuit, including two subsidiary parallel circuits, provides a means for indicating two undesired operating conditions of the vehicle, namely, the unsafe closed position of the hood and the application of the hand brake when the vehicle is moving. By incorporating the ignition switch 80 into the circuit, neither signalling device is operable unless the ignition switch is turned on. Thus the vehicle when parked and inoperative may have either the hood raised or the hand brake applied without flashing the signal 28.

Although the hood indicating means is herein illustrated and described as being incorporated into the hand brake signalling means it is understood that its circuit may be entirely separate from that of the hand brake and provided with a separate warning indicator.

What we claim is:

1. In combination with an upwardly and rearwardly opening hood on the front end of an automobile having a primary latch for holding the hood firmly closed and a secondary latch for holding the hood loosely closed, a warning electric signalling device in the driver compartment of the automobile, a circuit for the signalling device including a switch mounted in a fixed part of the automobile adjacent to the hood, said switch having a movable element engageable by the hood in the closing positions thereof and arranged to open the switch when the hood is held closed by the primary latch and to close the switch when the hood is held closed only by the secondary latch.

2. In combination with an automobile having an upwardly and rearwardly opening hood on the front end thereof and having a primary latch for pulling the hood firmly shut and a secondary latch for holding the hood loosely shut, an electric warning circuit including a signal lamp in the driver compartment of the automobile, a make and break switch operatively associated with the hood and including a movable electric contact member yieldingly biased to closed position, and means engageable with said contact member and moving the same to circuit open position when the hood is pulled shut by the primary latch and for disengaging the member and allowing the same to move to circuit closed position when the hood moves to the position where it is held by the secondary latch.

JOHN JEFFREY.
THOMAS T. MAY.

REFERENCES CITED

The following references are of record in the file of this patent:

UNITED STATES PATENTS

| Number | Name | Date |
|---|---|---|
| 1,223,060 | Louthan | Apr. 17, 1917 |
| 2,149,695 | Wilhelm | Mar. 7, 1939 |
| 2,414,343 | Stoeck et al. | Jan. 14, 1947 |
| 2,424,719 | Stoeck et al. | July 29, 1947 |